United States Patent
Endo

(10) Patent No.: US 9,684,300 B2
(45) Date of Patent: Jun. 20, 2017

(54) SEMICONDUCTOR DEVICE, MOTOR CONTROL DEVICE, LENS UNIT FOR IMAGING APPARATUS, AND IMAGING APPARATUS

(71) Applicant: RENESAS ELECTRONICS CORPORATION, Tokyo (JP)

(72) Inventor: Shigeyuki Endo, Kodaira (JP)

(73) Assignee: Renesas Electronics Corporation, Tokyo (JP)

( * ) Notice: Subject to any disclaimer, the term of this patent is extended or adjusted under 35 U.S.C. 154(b) by 107 days.

(21) Appl. No.: 14/827,289

(22) Filed: Aug. 15, 2015

(65) Prior Publication Data

US 2016/0054728 A1 Feb. 25, 2016

(30) Foreign Application Priority Data

Aug. 20, 2014 (JP) ................ 2014-167666

(51) Int. Cl.
| | |
|---|---|
| G05B 19/414 | (2006.01) |
| G02B 7/02 | (2006.01) |
| G02B 7/28 | (2006.01) |
| H02P 5/68 | (2006.01) |
| G03B 3/10 | (2006.01) |
| G03B 5/00 | (2006.01) |
| G02B 7/10 | (2006.01) |
| H02P 5/69 | (2006.01) |

(52) U.S. Cl.
CPC .......... *G05B 19/414* (2013.01); *G02B 7/102* (2013.01); *G02B 7/282* (2013.01); *G03B 3/10* (2013.01); *G03B 5/00* (2013.01); *H02P 5/69* (2013.01); *G03B 2205/0015* (2013.01); *G03B 2205/0046* (2013.01)

(58) Field of Classification Search
None
See application file for complete search history.

(56) References Cited

U.S. PATENT DOCUMENTS

| | | | | |
|---|---|---|---|---|
| 4,641,069 A | * | 2/1987 | Fujioka | G05B 19/4144 318/51 |
| 5,241,250 A | * | 8/1993 | Nagasawa | G05B 19/4141 318/53 |
| 5,362,222 A | * | 11/1994 | Faig | B29C 45/7666 264/40.3 |
| 5,893,651 A | * | 4/1999 | Sakamoto | G02B 7/102 348/240.3 |

(Continued)

FOREIGN PATENT DOCUMENTS

| | | |
|---|---|---|
| JP | H05-80399 A | 4/1993 |
| JP | 2013-029666 A | 2/2013 |

*Primary Examiner* — W B Perkey
(74) *Attorney, Agent, or Firm* — McGinn IP Law Group, PLLC

(57) ABSTRACT

In a motor control device, a matrix circuit and logic circuits are arranged between PWM signal generation circuits and output terminals. It is possible to output PWM signals to the output terminals as they are and to synchronize the PWM signals and output a synchronized signal to a desired output terminal/terminals in the output terminals by changing a coupled state of the matrix circuit. Therefore, it is possible to change the kind of the motor to be controlled, the number of motors to be controlled and so forth without changing the motor control device.

16 Claims, 16 Drawing Sheets

(56) References Cited

U.S. PATENT DOCUMENTS

2003/0231879 A1* 12/2003 Kohno ..................... H02P 5/60
396/79
2016/0054728 A1* 2/2016 Endo ........................ H02P 5/69
359/824

* cited by examiner

SEMICONDUCTOR DEVICE, MOTOR CONTROL DEVICE, LENS UNIT FOR IMAGING APPARATUS, AND IMAGING APPARATUS

CROSS-REFERENCE TO RELATED APPLICATIONS

The disclosure of Japanese Patent Application No. 2014-167666 filed on Aug. 20, 2014 including the specification, drawings and abstract is incorporated herein by reference in its entirety.

BACKGROUND

The present invention relates to a semiconductor device, a motor control device, a lens unit for imaging apparatus, and an imaging apparatus.

In the technical filed of the lens unit used in the imaging apparatus such as an interchangeable lens for a single-lens reflex digital camera and so forth, provision of a motor and a control device adapted to control driving of the motor is unavoidable for lens aperture adjustment, focus adjustment, focal distance adjustment and optical image stabilization (camera shake correction) mechanisms and so forth.

For example, in Japanese Unexamined Patent Application Publication No. Hei 5(1993)-80399, there is disclosed a control device including an MCU (Micro Controller Unit), a PWM device that generates a PWM (Pulse Width Modulation) signal on the basis of a command from the MCU and a motor that is driven in accordance with the PWM signal.

In addition, in Japanese Unexamined Patent Publication No. 2013-29666, there is disclosed a control device including a plurality of CPUs (Central processing Units) and a motor that is driven on the basis of a command from each of the CPUs.

SUMMARY

However, in a case where a plurality of controlled objects are to be managed by a single CPU, there is such a disadvantage that provision of a high-performance CPU is unavoidable and hence power consumption is increased. In addition, in a case where the CPUs that respectively correspond to the motors to be controlled are provided for low power consumption, since each motor control device is immobilized for each motor to be controlled, there is such a disadvantage that in a case where the kind of the motor to be controlled, the number of the motors to be controlled and so forth have been changed, provision of a motor control device of a new configuration is unavoidable.

Other subjects and novel features will become apparent from description of the present specification and the appended drawings.

According to one embodiment of the present invention, there is provided a motor control device that includes a plurality of PWM signal generation circuits, a plurality of output terminals and a switch circuit that selectively gives the PWM signal generated by each of the PWM signal generation circuits to any of the plurality of output terminals.

According to the above-mentioned one embodiment, it is possible to change the kind of the motor to be controlled, the number of the motors to be controlled and so forth without changing the motor control device.

DETAILED DESCRIPTION

Configuration Example 1 Examined by the Inventors and Others

Figure 1:
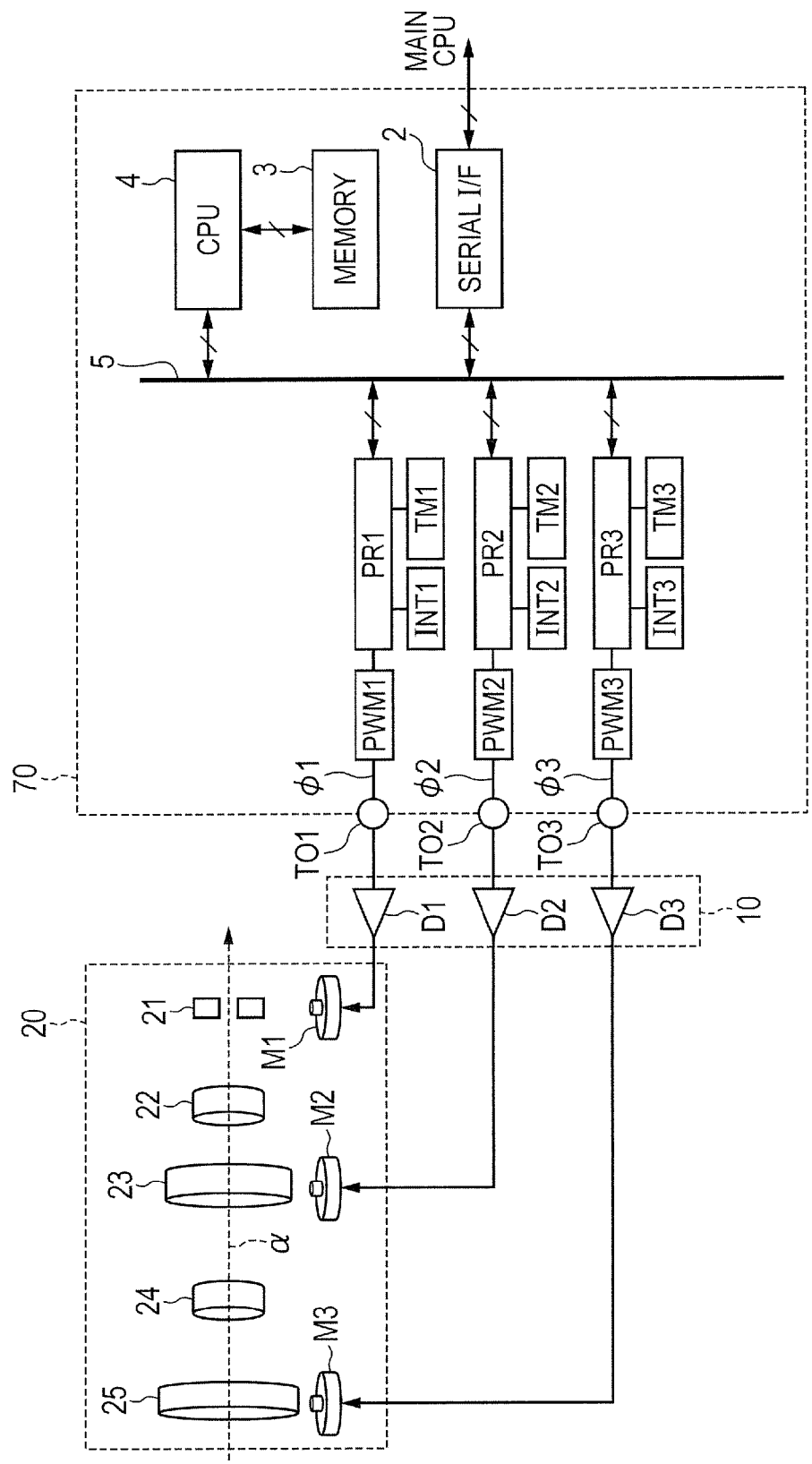
FIG. 1 is a circuit block diagram illustrating one example of a configuration of a digital camera including a motor control device according to a configuration example 1 examined by the inventors and others.

FIG. 1 is a circuit block diagram illustrating one example of a configuration of a digital camera including a motor control device 70 according to a configuration example 1 that has been examined by the inventors and others of the present application. In FIG. 1, the digital camera includes the motor control device 70, a driver IC 10 and a lens unit 20. The motor control device 70 includes a serial I/F (interface) 2, a memory 3, a CPU 4, a data bus 5, processors PR1 to PR3, timers TM1 to TM3, interruption controllers INT1 to INT3 and PWM signal generation circuits PWM1 to PWM3.

The serial I/F 2 performs information transmission and reception between a main CPU (not illustrated) and the data bus 5. A program to be executed by the CPU 4 is stored in the memory 3. The CPU 4 executes the program read out from the memory 3. Further, the CPU 4 controls the entire of the motor control device 70 in accordance with a command signal that is given from, for example, an operation unit of a digital camera via the main CPU, the serial I/F 2 and the data bus 5.

The timer TM1 generates a reference clock signal. The interruption controller INT1 generates an interruption control signal in response to, for example, a signal and so forth from a position sensor that detects the position of a lens. The processor PR1 generates information (a duty ratio and so forth) for generating a PWM signal on the basis of an external command signal given from the CPU 4, the reference clock signal from the timer TM1 and the interruption control signal from the interruption controller INT1. The PWM signal generation circuit PWM1 generates a PWM signal □1 on the basis of the information generated by the processor PR1.

The timer TM2 generates a reference clock signal. The interruption controller INT2 generates an interruption control signal in response to, for example, a signal and so forth from a position sensor that detects the position of a lens. The processor PR2 generates information (a duty ratio and so forth) for generating a PWM signal on the basis of an external command signal given from the CPU 4, the reference clock signal from the timer TM2 and the interruption control signal from the interruption controller INT2. The PWM signal generation circuit PWM2 generates a PWM signal □2 on the basis of the information generated by the processor PR2.

The timer TM3 generates a reference clock signal. The interruption controller INT3 generates an interruption control signal in response to, for example, a signal and so forth from a position sensor that detects the position of a lens. The processor PR3 generates information (a duty ratio and so forth) for generating a PWM signal on the basis of an external command signal given from the CPU 4, the reference clock signal from the timer TM3 and the interruption control signal from the interruption controller INT3. The PWM signal generation circuit PWM3 generates a PWM signal □3 on the basis of the information generated by the processor PR3.

The driver IC 10 includes three drivers D1 to D3. Each of the drivers D1 to D3 supplies a current for driving a motor concerned to the lens unit 20 in response to a signal from each of output terminals TO1 to TO3 of the motor control device 70.

The lens unit 20 includes a diaphragm mechanism 21, lenses 22 to 25 and motors M1 to M3. The motor M1 is driven with an output current from the driver D1 and adjusts the amount of light α passing through the lenses 22 to 25 by adjusting the opening degree of the diaphragm mechanism 21, thereby adjusting brightness of an image. The motor M2 is driven with an output current from the driver D2 and adjusts the position in an optical axis direction of the lens 23, thereby focusing the lens on an object. When a shutter button of the digital camera is half-pressed, the motor M2 is driven by an auto-focusing function and the lens is automatically focused on the object.

The motor M3 is driven with an output current from the driver D3 and changes a focal distance by adjusting the position in an optical axis direction of the lens 25, thereby optically changing the size of a photographing range. When a zoom button of the digital camera is operated, the motor M3 is driven by a zooming function and a rate of magnification of the image is changed.

In the motor control device 70, although it is possible to control the motors M1 to M3 of the lens unit 20, it is difficult to control motors of another lens unit of a different specification. Therefore, in a case where the kind of the motor to be controlled, the number of the motors to be controlled and so forth have been changed, it is unavoidable to design a new motor control device.

Configuration Example 2 Examined by the Inventors and Others

Figure 2:
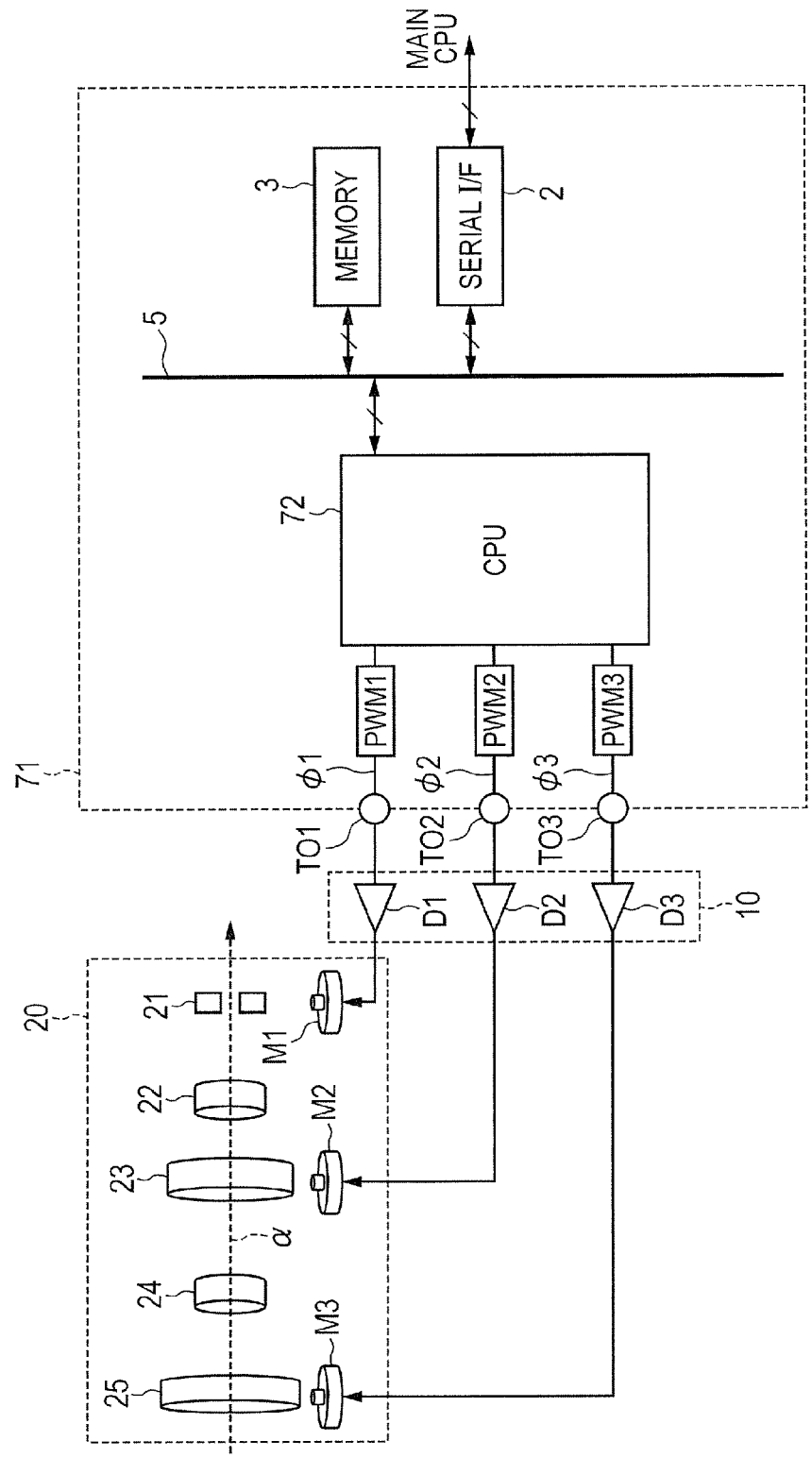
FIG. 2 is a circuit block diagram illustrating one example of a digital camera including a motor control device according to a configuration example 2 examined by the inventors and others.

FIG. 2 is a circuit block diagram illustrating one example of main parts of a digital camera according to a configuration example 2 that has been examined by the inventors and others of the present application and is the diagram to be compared with that in FIG. 1. With reference to FIG. 2, the digital camera according to the configuration example 2 is different from the digital camera in FIG. 1 in that the motor control device 70 is replaced with a motor control device 71. The motor control device 71 is of the type that the CPU 4, the processors PR1 to PR3, the timers TM1 to TM3 and the interruption controllers INT1 to INT3 of the motor control device 70 are replaced with one CPU 72.

In the configuration example 2, provision of the high-performance CPU 72 is unavoidable in order to manage a plurality of controlled objects and the power consumption is increased in comparison with the configuration example 1. In the following, embodiments making it possible to eliminate the disadvantages of the configuration examples 1 and 2 will be described in detail.

First Embodiment

Figure 3:
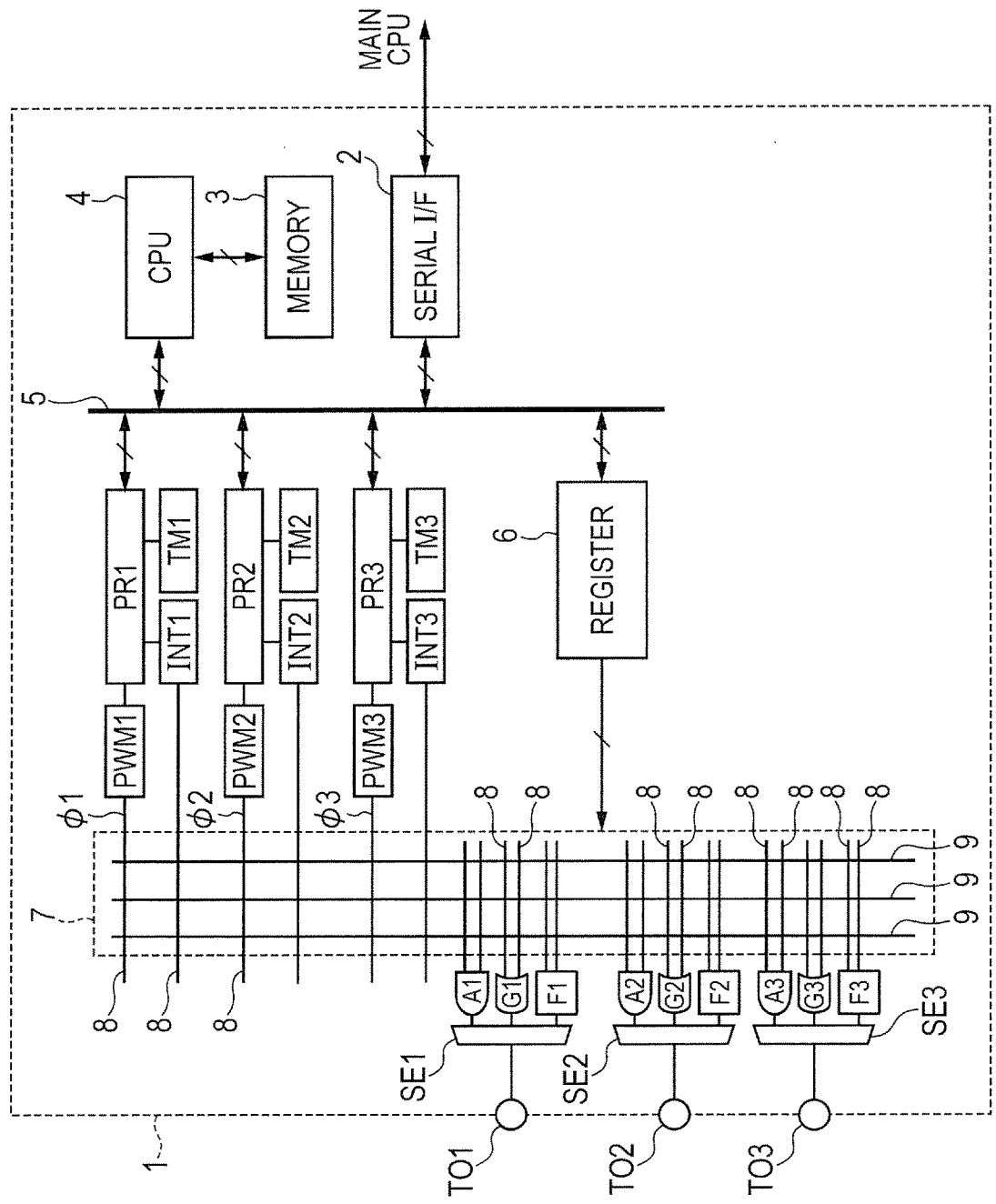
FIG. 3 is a circuit block diagram illustrating one example of a configuration of a motor control device according to a First Embodiment of the present application.

FIG. 3 is a circuit block diagram illustrating one example of a configuration of a motor control device 1 according to a First Embodiment of the present application. With reference to FIG. 3, the motor control device 1 is different from the motor control device 70 in FIG. 1 in that a register 6, a matrix circuit 7, AND gates A1 to A3, OR gates G1 to G3, flip-flops F1 to F3 and selectors SE1 to SE3 are added. The matrix circuit 7 configures a first switch circuit. The AND gates A1 to A3, the OR gates G1 to G3, the flip-flops F1 to F3 and the selectors SE1 to SE3 configure a plurality of logic circuits.

Figure 4:
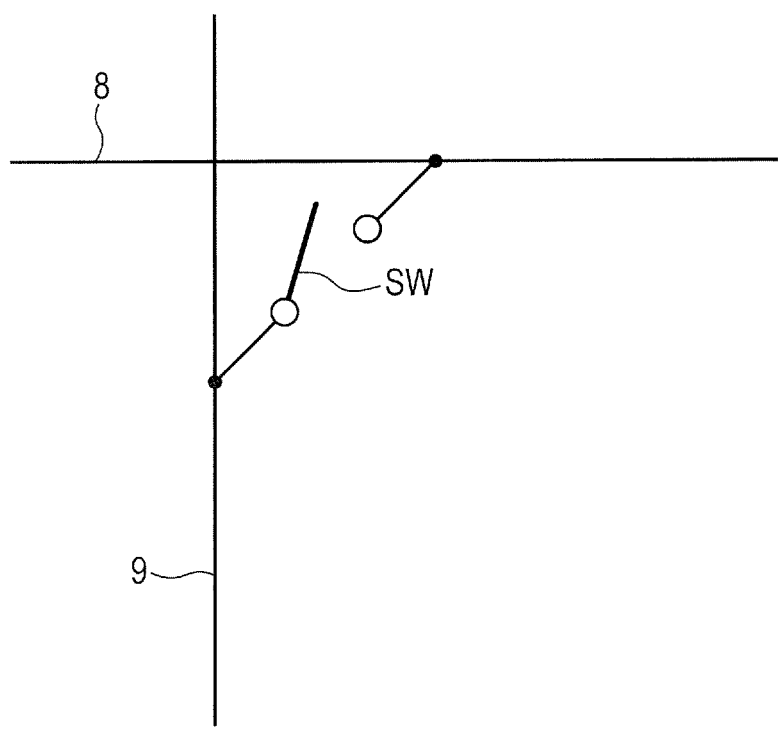
FIG. 4 is a circuit diagram illustrating one example of a switch included in a matrix circuit illustrated in FIG. 3.

Coupling information for setting a coupled state of the matrix circuit 7 is stored in the register 6. The coupling information is made changeable. The matrix circuit 7 includes a plurality of X wiring lines 8 that extend in a lateral direction (an X direction) in the drawing and a plurality of Y wiring lines 9 that extend in a vertical direction (a Y direction) in the drawing. Each X wiring line 8 and each Y wiring line are mutually insulated. A switch SW coupled between each X wiring line 8 and each Y wiring line 9 is provided on an intersection part between each X wiring line 8 and each Y wiring line 9 as illustrated in FIG. 4. The switches SW are arranged on all of the intersection parts between the plurality of X wiring lines 8 and the plurality of Y wiring lines 9. Each switch SW is turned on or off with an output signal from the register 6. In addition, the motor control device 1 may be also configured that the above-mentioned coupling information is stored in other memory units such as a ROM and so forth, in addition to storage of the coupling information into the register 6.

One ends of three X wiring lines 8 are respectively coupled to output nodes of the PWM signal generation circuits PWM1 to PWM3. One ends of other three X wiring lines 8 are respectively coupled to input nodes of the interruption controllers INT1 to INT3. The other ends of further other six X wiring lines 8 are respectively coupled to both of two input nodes of the AND gates A1 to A3. The other ends of still further other six X wiring lines 8 are respectively coupled to both of two input nodes of the OR gates G1 to G3. The other ends of still further other six X wiring lines 8 are respectively coupled to set terminals and reset terminals of the flip-flops F1 to F3.

Each of the AND gates A1 to A3 outputs an AND signal of two signals given to its two input nodes. Each of the OR gates G1 to G3 outputs an OR signal of two signals given to its two input nodes. In addition, in a case where the signal has been given to only one of the two input nodes, each of the OR gates G1 to G3 makes the signal pass as it is. Each of the flip-flops F1 to F3 is set and outputs an "H" level signal to the output terminal when a signal is given to the set terminal and is reset and outputs an "L" level signal to the output terminal when the signal is given to the reset terminal.

The selector SE1 receives an output signal from the AND gate A1, an output signal from the OR gate G1 and an output signal from the flip-flop F1 and outputs any of the three signals selected by the CPU 4 or the register 6 to the output terminal TO1.

The selector SE2 receives an output signal from the AND gate A2, an output signal from the OR gate G2 and an output signal from the flip-flop F2 and outputs any of the three signals selected by the CPU 4 or the register 6 to the output terminal TO2.

The selector SE2 receives an output signal from the AND gate A3, an output signal from the OR gate G3 and an output signal from the flip-flop F3 and outputs any of the three signals selected by the CPU 4 or the register 6 to the output terminal TO3.

(Using Method 1)

Figure 5:
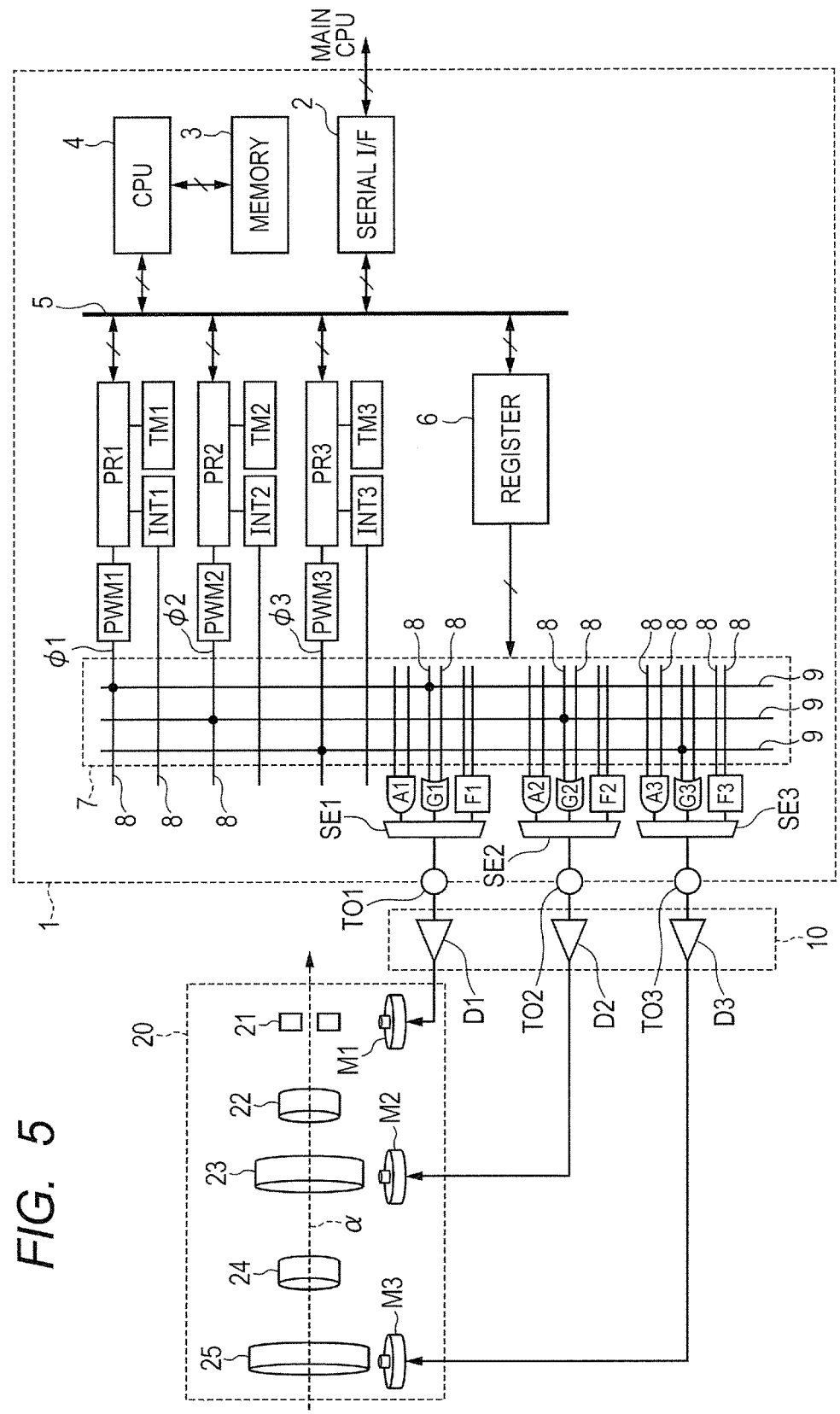
FIG. 5 is a circuit block diagram illustrating one example of main parts of a digital camera including the motor control device illustrated in FIG. 3.

Next, a using method 1 of the motor control device 1 will be described. FIG. 5 is a circuit block diagram illustrating one example of main parts of a digital camera that includes the motor control device 1. In FIG. 5, the digital camera includes the motor control device 1, the driver IC 10 and the lens unit 20. The driver IC 10 and the lens unit 20 are the same as those described with reference to FIG. 1.

A matrix set signal for giving three PWM signals □1 to □3 respectively to the OR gates G1 to G3 is written into the register 6 of the motor control device 1. In addition, a selector set signal for giving the output signals from the OR gates G1 to G3 respectively to the output terminals TO1 to TO3 is written into the register 6. That is, each corresponding relation between each of the PWM signal generation circuits RWM1 to PWM3 and each of the output terminals TO1 to TO3 is written into the register 6.

In the matrix circuit 7, each switch SW is turned on or off in accordance with the matrix set signal from the register 6. In FIG. 5, the switches SW on the intersection parts indicated by black spots in the plurality of intersection parts between the plurality of X wiring lines 8 and the plurality of Y wiring lines 9 are turned on and the switches SW other than the above-mentioned switches are turned off. Three X wiring lines 8 that respectively receive the PWM signals □1 to □3 are respectively coupled to three Y wiring lines 9 and the three Y wiring lines 9 are respectively coupled to three X wiring lines 8 each of which is coupled to one of the input nodes of each of the OR gates G1 to G3.

The selector SE1 gives an output signal from the OR gate G1 to the output terminal TO1 in accordance with the selector set signal from the register 6. The selector SE2 gives an output signal from the OR gate G2 to the output terminal TO2 in accordance with the selector set signal from the register 6. The selector SE3 gives an output signal from the OR gate G3 to the output terminal TO3 in accordance with the selector set signal from the register 6.

Thereby, the PWM signal □1 that has been generated by the PWM signal generation circuit PWM1 is given to the driver D1 via the matrix circuit 7, the OR gate G1, the selector SE1 and the output terminal TO1, the motor M1 is driven by the driver D1 and the opening degree of the diaphragm mechanism 21 is adjusted.

In addition, the PWM signal □2 that has been generated by the PWM signal generation circuit PWM2 is given to the driver D2 via the matrix circuit 7, the OR gate G2, the selector SE2 and the output terminal TO2, the motor M2 is driven by the driver D2 and the position of the lens 23 for use in auto-focusing is adjusted.

In addition, the PWM signal □3 that has been generated by the PWM signal generation circuit PWM3 is given to the driver D3 via the matrix circuit 7, the OR gate G3, the selector SE3 and the output terminal TO3, the motor M3 is driven by the driver D3 and the position of the lens 25 for use in zooming is adjusted.

Figure 6:
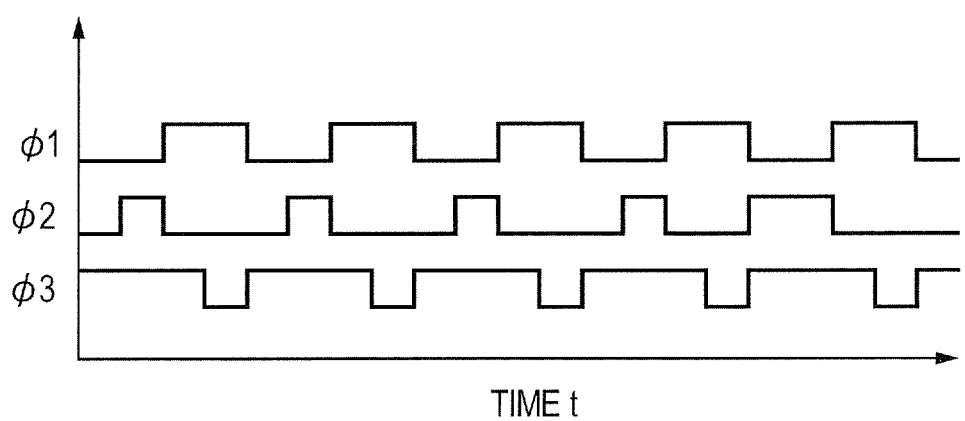
FIG. 6 is a time chart illustrating one example of waveforms of PWM signals illustrated in FIG. 5.

FIG. 6 is a time chart illustrating one example of waveforms of the PWM signals □1 to □3. As illustrated in FIG. 6, duty ratios of the three PWM signals □1 to □3 are separately set. Incidentally, the duty ratio is a ratio T1/T2 of an "H" level time T1 to a time T2 for one cycle in one cycle of each PWM signal. In the digital camera illustrated in FIG. 5, the PWM signals □1 to □3 are respectively output to the output terminals TO1 to TO3 as they are (Using Method 2)

Figure 7:
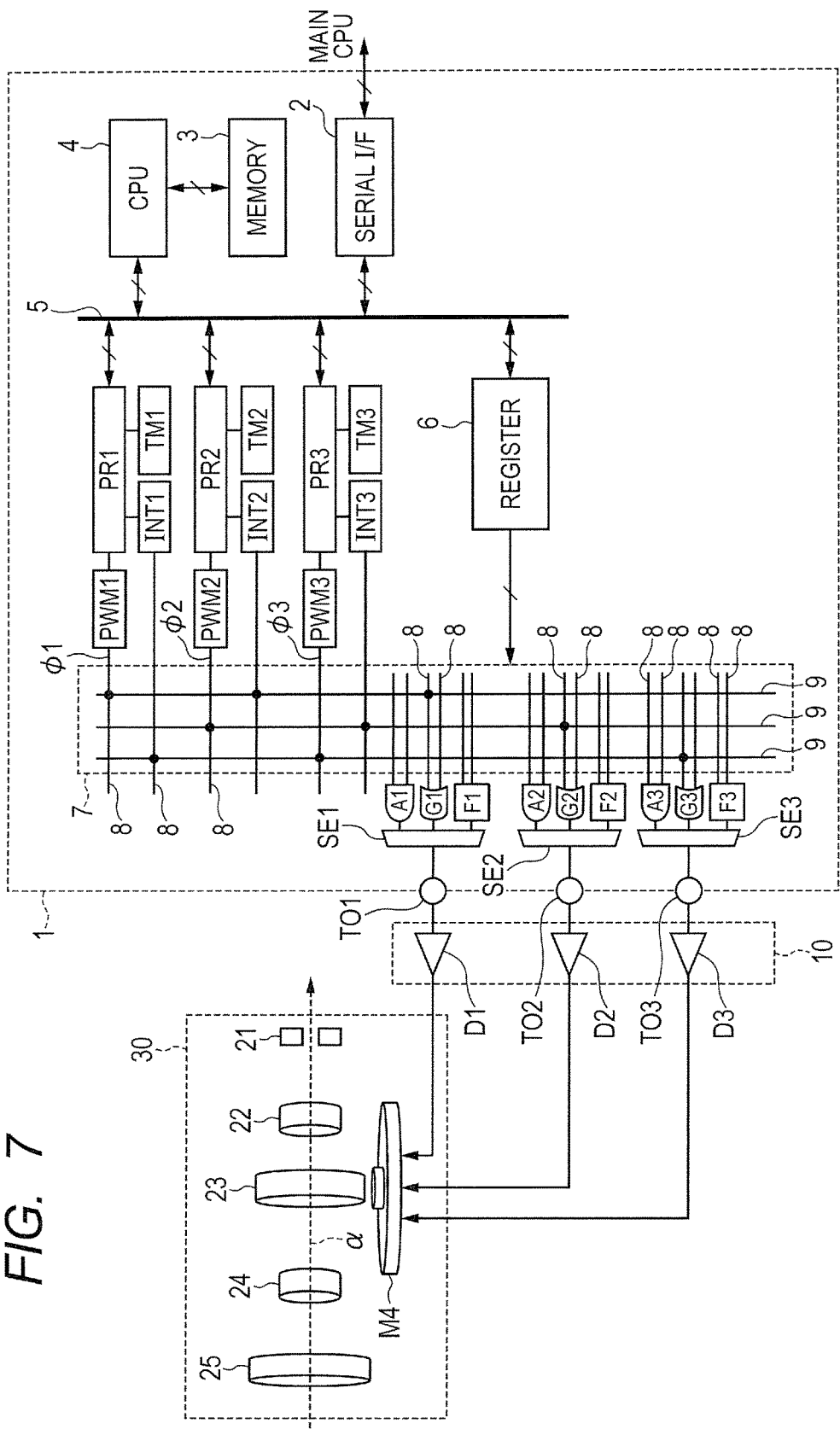
FIG. 7 is a circuit block diagram illustrating one example of main parts of another digital camera including the motor control device illustrated in FIG. 3.

Next, another using method 2 of the motor control device 1 will be described. FIG. 7 is a circuit block diagram illustrating one example of main parts of another digital camera that includes the motor control device 1. In FIG. 7, the digital camera includes the motor control device 1, the driver IC 10 and a lens unit 30. The driver IC 10 is the same as that described with reference to FIG. 1.

The lens unit 30 includes the diaphragm mechanism 21, the lenses 22 to 25 and a three-phase motor M4. The three-phase motor M4 is driven with output currents from the drivers D1 to D3 and adjusts the position in the optical axis direction of the lens 23 to focus the lens on the object. When the shutter button of the digital camera is half-pressed, the motor M4 is driven by the auto-focusing function and the lens is automatically focused on the object.

The matrix set signal for giving the three PWM signals □1 to □3 respectively to the OR gates G1 to G3 and also respectively to the interruption controllers INT 2, INT3 and INT1 is written into the register 6 of the motor control device 1. In addition, the selector set signal for giving the output signals from the OR gates G1 to G3 respectively to the output terminals TO1 to TO3 is written into the register 6. That is, each corresponding relation among each of the PWM signal generation circuits RWM1 to PWM3, each of the output terminals TO1 to TO3 and each of the interruption controllers INT1 to INT3 is written into the register 6 in one-to-one correspondence.

In the matrix circuit 7, each switch SW is turned on or off in accordance with the matrix set signal from the register 6. In FIG. 7, the switches SW on the intersection parts indicated by the black spots in the plurality of intersection parts between the plurality of X wiring lines 8 and the plurality of Y wiring lines 9 are turned on and the switches SW other than the above-mentioned switches are turned off. Three X wiring lines 8 that respectively receive the PWM signals □1 to □3 are respectively coupled to three Y wiring lines 9 and the three Y wiring lines 9 are respectively coupled to three X wiring lines 8 each being coupled to one of the input nodes of each of the OR gates G1 to G3 and are respectively coupled to three X wiring lines 8 that have been respectively coupled to the interruption controllers INT2, INT3 and INT1.

The interruption controller INT1 gives a timing control signal indicating a level change timing of the PWM signal □3 to the processor PR1. The interruption controller INT2 gives a timing control signal indicating a level change timing of the PWM signal □1 to the processor PR2. The interruption controller INT3 gives a timing control signal indicating a level change timing of the PWM signal □2 to the processor PR3. The processors PR1 to PR3 generate the three-phase PWM signals □1 to □3 in accordance with the signals from the interruption controllers INT1 to INT3 and the timers TM1 to TM3.

The selector SE1 gives the output signal from the OR gate G1 to the output terminal TO1 in accordance with the selector set signal from the register 6. The selector SE2 gives the output signal from the OR gate G2 to the output terminal TO2 in accordance with the selector set signal from the register 6. The selector SE3 gives the output signal from the OR gate G3 to the output terminal TO3 in accordance with the selector set signal from the register 6.

Thereby, the PWM signal □1 that has been generated by the PWM signal generation circuit PWM1 is given to the driver D1 via the matrix circuit 7, the OR gate G1, the selector SE1 and the output terminal TO1 and a first phase current is supplied from the driver D1 to the three-phase motor M4.

In addition, the PWM signal □2 that has been generated by the PWM signal generation circuit PWM2 is given to the driver D2 via the matrix circuit 7, the OR gate G2, the selector SE2 and the output terminal TO2 and a second phase current is supplied from the driver D2 to the three-phase motor M4.

In addition, the PWM signal □3 that has been generated by the PWM signal generation circuit PWM3 is given to the driver D3 via the matrix circuit 7, the OR gate G3, the selector SE3 and the output terminal TO3 and a third phase current is supplied from the driver D3 to the three-phase motor M4.

Figure 8:
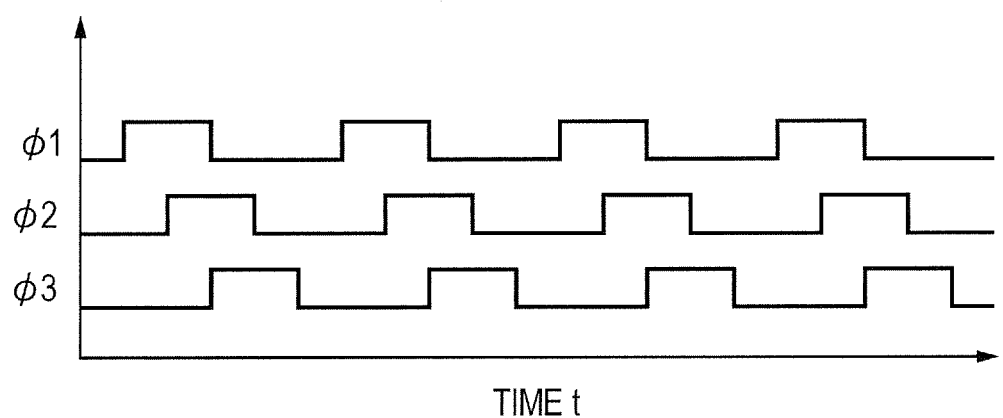
FIG. 8 is a time chart illustrating one example of waveforms of PWM signals illustrated in FIG. 7.

FIG. 8 is a time chart illustrating one example of waveforms of the PWM signals □1 to □3. As illustrated in FIG. 8, the duty ratios of the three PWM signals □1 to □3 are set to the same value and the three PWM signals □1 to □3 are out of phase with one another by the same angle. In the digital camera in FIG. 7, the PWM signals □1 to □3 are respectively output to the output terminals TO1 to TO3 as they are.

(Using Method 3)

Figure 9:
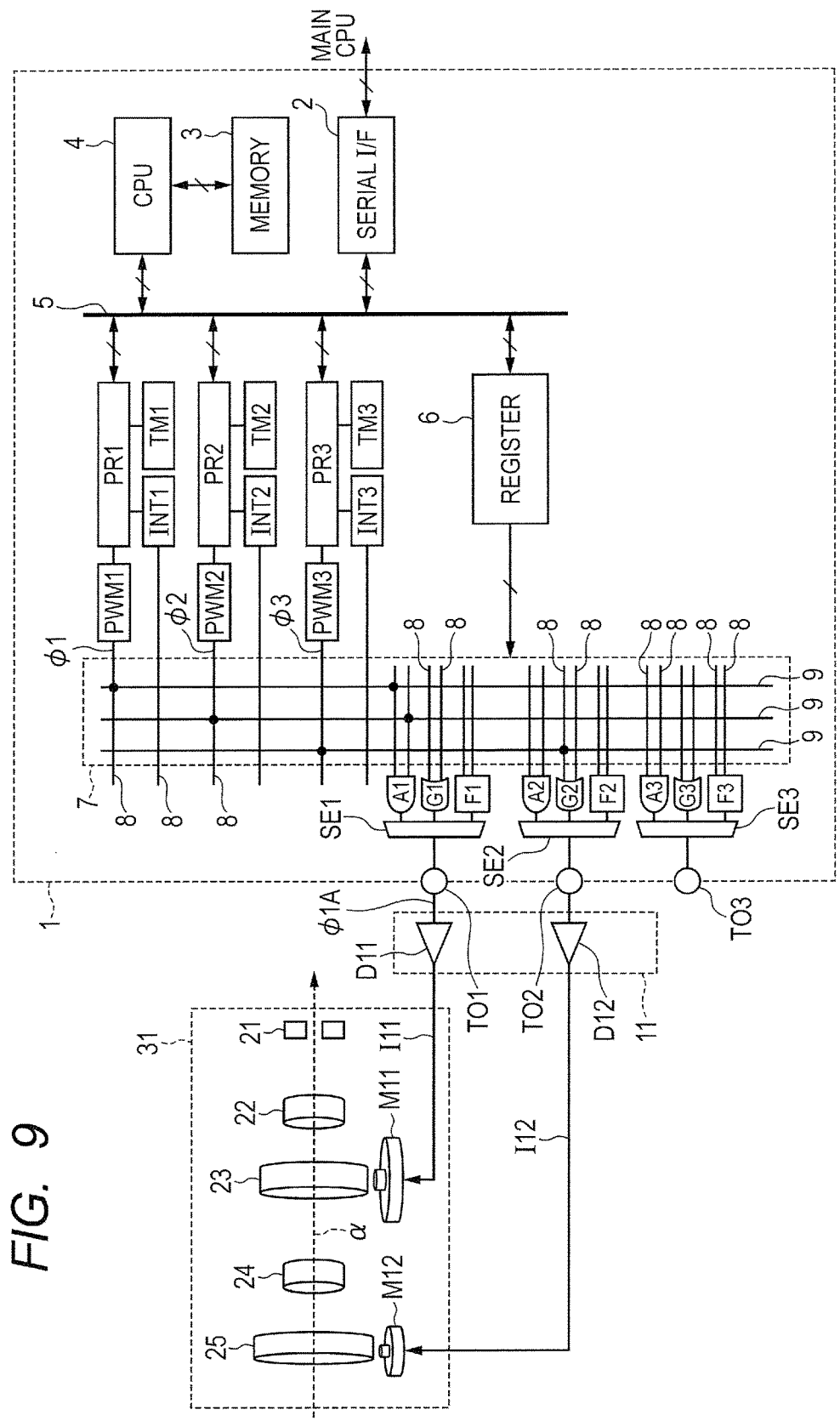
FIG. 9 is a circuit block diagram illustrating one example of main parts of further another digital camera including the motor control device illustrated in FIG. 3.

Next, still further another using method 3 of the motor control device 1 will be described. FIG. 9 is a circuit block diagram illustrating one example of main parts of still further another digital camera that includes the motor control device 1. In FIG. 9, the digital camera includes the motor control device 1, a driver IC 11 and a lens unit 31.

The driver IC 11 includes two drivers D11 and D12. The drivers D11 and D12 respectively supply motor driving currents I11 and I12 to the lens unit 31 in response to signals from the output terminals TO1 and TO2 of the motor control device 1.

The lens unit 31 includes the diaphragm mechanism 21, the lenses 22 to 25 and motors M11 and M12. The motor M11 is driven with the output current I11 of the driver D11 and adjusts the position in a direction orthogonal to the optical axis of the lens 23 to correct blurring of a photographed screen caused by camera shake and so forth. Blurring of the photographed screen is detected by a camera shake detection device (not illustrated) and the motor M12 is driven on the basis of a result of detection. The motor M12 is driven with the output current I12 of the driver D12 and adjusts the position in the optical axis direction of the lens 25 to focus the lens on the object. When the shutter button of the digital camera is half-pressed, the motor M12 is driven by the auto-focusing function and the lens is automatically focused on the object.

The matrix set signal for giving the PWM signals □1 and □2 to the AND gate A1 and giving the PWM signal □3 to the OR gate G2 is written into the register 6 of the motor control device 1. In addition, the selector set signal for giving the output signals from the AND gate A1 and the OR gate G2 respectively to the output terminals TO1 and TO2 is written into the register 6. That is, each corresponding relation among each of the PWM signal generation circuits RWM1 to PWM3, each of the logic circuits which is configured by each of the AND gates A1 to A3, each of the OR gates G1 to G3, each of the flip-flops F1 to F3 and each of the selectors SE1 to SE3, and each of the output terminals TO1 to TO3 is written into the register 6.

In the matrix circuit 7, each switch SW is turned on or off in accordance with the matrix set signal from the register 6. In FIG. 9, the switches SW on the intersection parts indicated by the black spots in the plurality of intersection parts between the plurality of X wiring lines 8 and the plurality of Y wiring lines 9 are turned on and the switches SW other than the above-mentioned switches SW are turned off. Two X wiring lines 8 that respectively receive the PWM signals □1 and □2 are respectively coupled to two Y wiring lines 9 and the two Y wiring lines 9 are respectively coupled to the two input nodes of the AND gate A1. One X wiring line 8 that receives the PWM signal □3 is coupled to one Y wiring line 9 and that Y wiring line 9 is coupled to one of the input nodes of the OR gate G2.

The selector SE1 gives the output signal from the AND gate A1 to the output terminal TO1 in accordance with the selector set signal from the register 6. The selector SE2 gives the output signal from the OR gate G2 to the output terminal TO2 in accordance with the selector set signal from the register 6.

Thereby, the PWM signals □1 and □2 that have been generated by the PWM signal generation circuits PWM1 and PWM2 are given to the AND gate A1 via the matrix circuit 7, an output signal □1A from the AND gate A1 is given to the driver D11 via the selector SE1 and the output terminal TO1, the motor M11 is driven by the driver D11 and the position of the lens 23 for use in image stabilization is adjusted.

In addition, the PWM signal □3 that has been generated by the PWM signal generation circuit PWM3 is given to the driver D12 via the matrix circuit 7, the OR gate G2, the selector SE2 and the output terminal TO2, the motor M12 is driven by the driver D12 and the position of the lens 25 for use in auto-focusing is adjusted.

Figure 10:
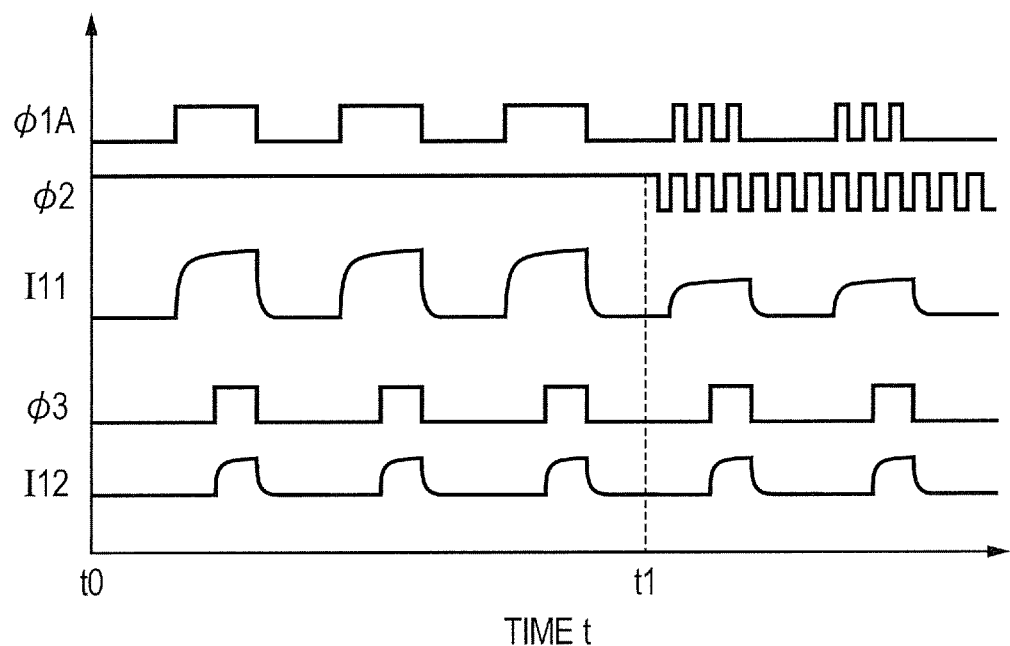
FIG. 10 is a time chart illustrating one example of waveforms of PWM signals and currents illustrated in FIG. 9.

FIG. 10 is a time chart illustrating one example of waveforms of the output signal □1A of the AND gate A1, the PWM signals □2 and □3 and the currents I11 and I12. In FIG. 10, in a period between times t0 and t1, the duty ratio of the PWM signal □2 is set to 1, the PWM signal □2 is fixed to the "H" level and the output signal □1A of the AND gate A1 becomes the same as the PWM signal □1. When the output signal □1A is set to the "H" level, the amount of the output current I11 of the driver D11 is increased, and when the output signal □1A is set to the "L" level, the amount of the output current I11 of the driver D11 is rapidly decreased.

When the PWM signal □3 is set to the "H" level, the amount of the output current I12 of the driver D12 is increased, and when the PWM signal □3 is set to the "L" level, the amount of the output current I12 of the driver D12 is rapidly decreased.

At the time t1, the duty ratio of the PWM signal □2 is set to ½ and the PWM signal □2 is alternately set to the "H" level and the "L" level in a cycle that is sufficiently shorter than that of the PWM signal □1. Therefore, in a period that the PWM signal □1 is at the "H" level, the signal □1A becomes the same as the PWM signal □2, and in a period that the PWM signal □1 is at the "L" level, the signal □1A is set to the "L" level. Accordingly, the amount of the current I11 obtained after the time t1 is reduced to almost half that of the current I11 obtained before the time t1. It is possible to finely adjust the amount of the current I11 by adjusting the duty ratio of the PWM signal □2 in this way.

(Using Method 4)

Figure 11:
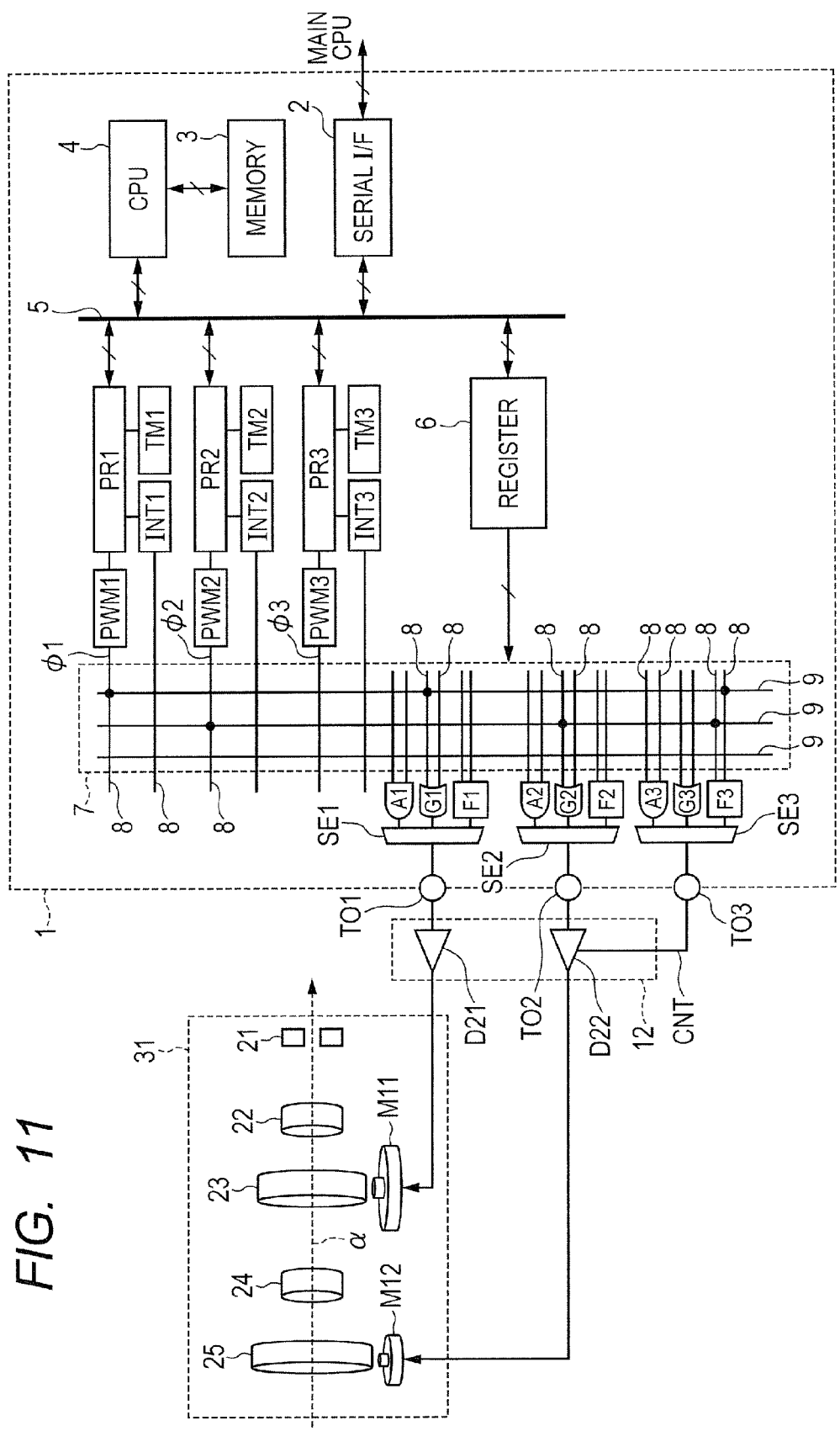
FIG. 11 is a circuit block diagram illustrating one example of main parts of still further another digital camera including the motor control device illustrated in FIG. 3.

Next, still further another using method 4 of the motor control device 1 will be described. FIG. 11 is a circuit block diagram illustrating one example of main parts of still further another digital camera including the motor control device 1 illustrated in FIG. 3. In FIG. 11, the digital camera includes the motor control device 1, a driver IC 12 and the lens unit 31.

The driver IC 12 includes two drivers D21 and D22. The driver D21 supplies a current to the motor M112 for use in image stabilization of the lens unit 31 in response to the signal from the output terminal TO1 of the motor control device 1. In a case where a control signal CNT from the output terminal TO3 of the motor control device 1 is at the "H" level that is an activated level, the driver D22 is activated and supplies a current to the motor M12 for use in auto-focusing of the lens unit 31 in response to the signal from the output terminal TO2. In a case where the control signal CNT from the output terminal TO3 of the motor control device 1 is at the "L" level that is a deactivated level, the driver D22 is deactivated and does not output the current. The configuration of the lens unit 31 is as described with reference to FIG. 9.

The matrix set signal for giving the PWM signals □1 and □2 respectively to the OR gates G1 and G2 and giving the PWM signals □1 and □2 respectively to the reset terminal and the set terminal of the flip-flop F3 is written into the register 6 of the motor control device 1. In addition, the selector set signal for giving the output signals from the OR gates G1 and G2 and the flip-flop F3 respectively to the output terminals TO1 to TO3 is written into the register 6. That is, each corresponding relation among each of the PWM signal generation circuits RWM1 to PWM3, each of the logic circuits which is configured by each of the AND gates A1 to A3, each of the OR gates G1 to G3, each of the flip-flops F1 to F3 and each of the selectors SE1 to SE3, and each of the output terminals TO1 to TO3 is written into the register 6.

In the matrix circuit 7, each switch SW is turned on or off in accordance with the matrix set signal from the register 6. In FIG. 11, the switches SW on the intersection parts indicated by the black spots in the plurality of intersection parts between the plurality of X wiring lines 8 and the plurality of Y wiring lines 9 are turned on and the switches SW other than the above-mentioned switches SW are turned off. Two X wiring lines 8 that respectively receive the PWM signals □1 and □2 are respectively coupled to two Y wiring lines 9, and the two Y wiring lines 9 are respectively coupled to two X wiring lines 8 that have been coupled to one input nodes of the OR gates G1 and G2 and respectively coupled to two X wiring lines 8 that have been coupled to the reset terminal and the set terminal of the flip-flop F3.

The selector SE1 gives the output signal from the OR gate G1 to the output terminal TO1 in accordance with the selector set signal from the register 6. The selector SE2 gives the output signal from the OR gate G2 to the output terminal TO2 in accordance with the selector set signal from the register 6. The selector SE3 gives the output signal CNT from the flip-flop F3 to the output terminal TO3 in accordance with the selector set signal from the register 6.

Thereby, the PWM signal □1 that has been generated by the PWM signal generation circuit PWM1 is given to the driver D21 via the matrix circuit 7, the OR gate G1, the selector SE1 and the output terminal TO1, the motor M11 is driven by the driver D21 and the position of the lens 23 for use in auto-focusing is adjusted.

In addition, the PWM signal □2 that has been generated by the PWM signal generation circuit PWM2 is given to the driver D22 via the matrix circuit 7, the OR gate G2, the selector SE2 and the output terminal TO2, the motor M12 is driven by the driver D22 and the position of the lens 25 for use in zooming is adjusted.

In addition, the PWM signals □1 and □2 are given to the flip-flop F3 via the matrix circuit 7, the output signal CNT from the flip-flop F3 is given to a control node of the driver D22 via the selector SE3 and the output terminal TO3 and the driver D22 is activated or deactivated with the control signal CNT.

Figure 12:
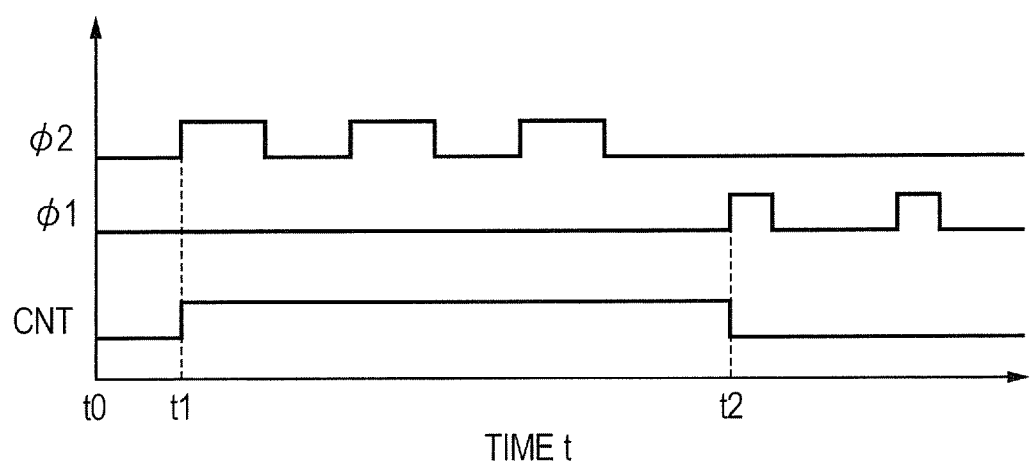
FIG. 12 is a time chart illustrating one example of waveforms of PWM signals and a control signal illustrated in FIG. 11.

FIG. 12 is a time chart illustrating one example of waveforms of the PWM signals □1 and □2. In FIG. 12, in this digital camera, auto-focusing and image stabilization are separately performed. At the time t0, the control signal CNT is set to the "L" level that is the deactivated level, and the driver D22 is deactivated and is maintained in a low power consumption state. When the PWM signal □2 rises from the "L" level to the "H" level at the time t1, the flip-flop F3 is set, the control signal CNT is set to the "H" level that is the activated level, and the driver D22 is activated and brought into an operation state. The driver D22 drives the motor M12 for use in auto-focusing in response to the PWM signal □2 from the output terminal TO2.

At the time t2, when the PWM signal □2 is fixed to the "L" level and the PWM signal □1 rises from the "L" level to the "H" level, the flip-flop F3 is reset, the control signal CNY is set to the "L" level that is the deactivated level and the driver D22 is deactivated and is brought into the low power consumption state. The driver D21 drives the motor M1 for use in image stabilization in response to the PWM signal □1 from the output terminal TO1.

As described above, in the First Embodiment, since the matrix circuit 7 has been provided between the PWM signal generation circuits PWM1 to PWM3 and the output terminals TO1 to TO3, it is possible to selectively give each of the PWM signals □1 to □3 to any of the output terminals TO1 to TO3. Further, since the AND gates A1 to A3, the OR gates G1 to G3, the flip-flops F1 to F3 and the selectors SE1 to DE3 have been provided between the matrix circuit 7 and the output terminals TO1 to TO3, it is possible to generate a new signal by synthesizing the PWM signals □1 to □3. Therefore, it is possible to change the kind of the motor to be controlled, the number of the motors to be controlled and so forth without changing the motor control device.

Second Embodiment

Figure 13:
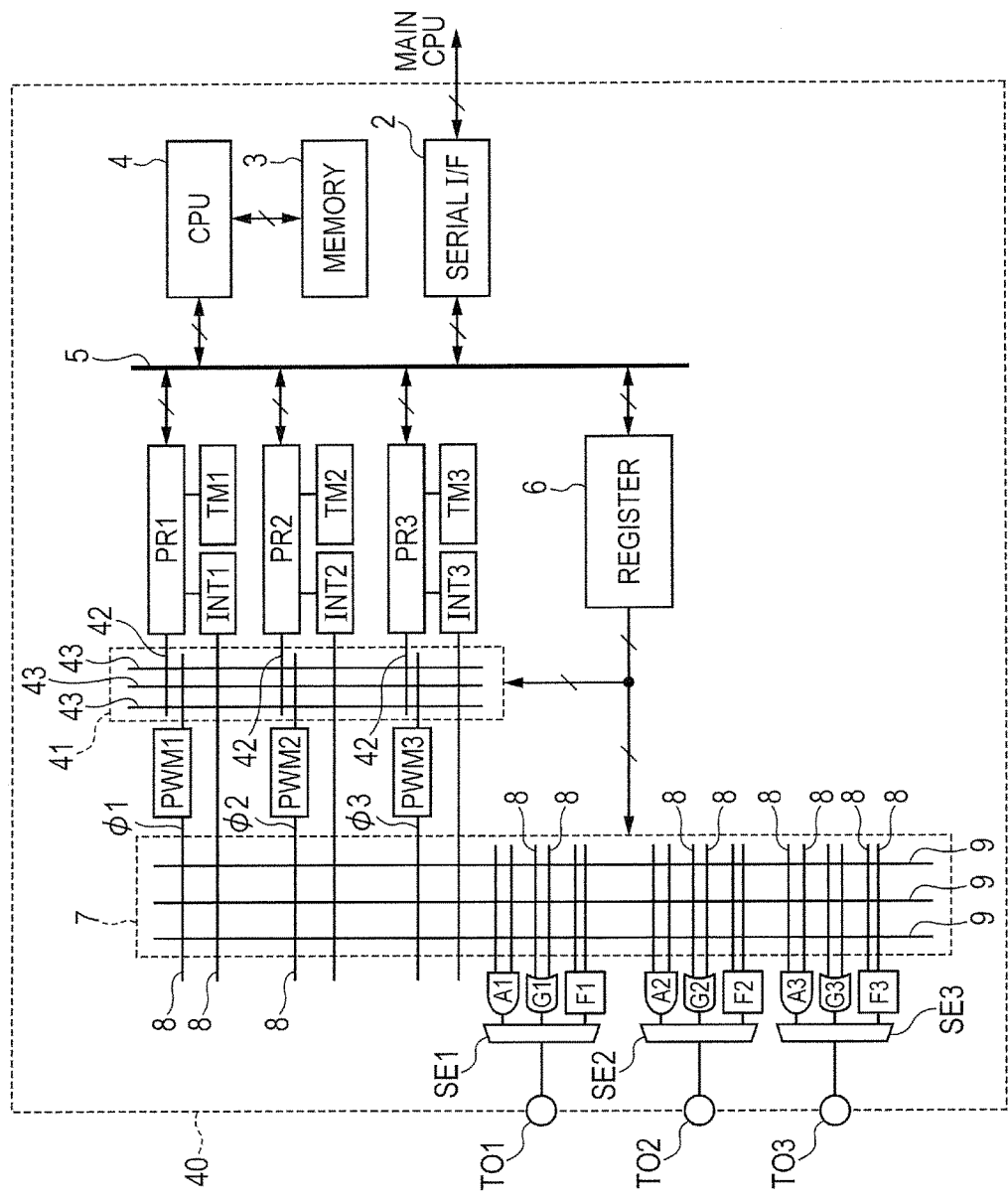
FIG. 13 is a circuit block diagram illustrating one example of a configuration of a motor control device according to a Second Embodiment of the present application.

FIG. 13 is a circuit block diagram illustrating one example of a configuration of a motor control device 40 according to a Second Embodiment of the present application and is the diagram to be compared with that in FIG. 3. With reference to FIG. 13, the motor control device 40 is different from the motor control device 1 in that a matrix circuit 41 is added between the processors PR1 to PR3 and the PWM signal generation circuits PWM1 to PWM3. The matrix circuit 41 configures a second switch circuit.

Similarly to the First Embodiment, a first matrix set signal for turning each of the plurality of switches SW included in the matrix circuit 7 on or off and the selector set signal for setting a selection state of each of the selectors SE1 to SE3 are written into the register 6. Further, a second matrix set signal for turning each of the plurality of switches SW included in the matrix circuit 41 on or off is written into the register 6.

That is, a first corresponding relation between each of the PWM signal generation circuits PWM1 to PWM3 and each of the output terminals TO1 to TO3 and a second corresponding relation between each of the processors PR1 to PR3 and each of the PWM signal generation circuits PWM1 to PWM3 are written into the register 6.

The matrix circuit 41 is the same as the matrix circuit 7 in configuration and includes a plurality (six in the drawing) of X wiring lines 42 and a plurality (three in the drawing) of Y wiring lines 43. Each of the X wiring lines 42 extends in the lateral direction (the X direction) and each of the Y wiring lines 43 extends in the vertical direction (the Y direction) in the drawing. Each of the switches WS illustrated in FIG. 4 is arranged on each of a plurality of intersection parts between the plurality of X wiring lines 42 and the plurality of Y wiring lines 43. Each switch SW is coupled between each X wiring line 42 and each Y wiring line 43 that mutually intersects on each corresponding intersection part and is turned on or off in response to the output signal from the register 6.

Therefore, in the motor control device 40, the same advantageous effects as those in the First Embodiment are obtained and such an advantageous effect is also obtained that it is possible to give the output signal from each processor PR to a desired PWM signal generation circuit/ circuits in the PWM signal generation circuits PWM1 to PWM3.

Figure 14:
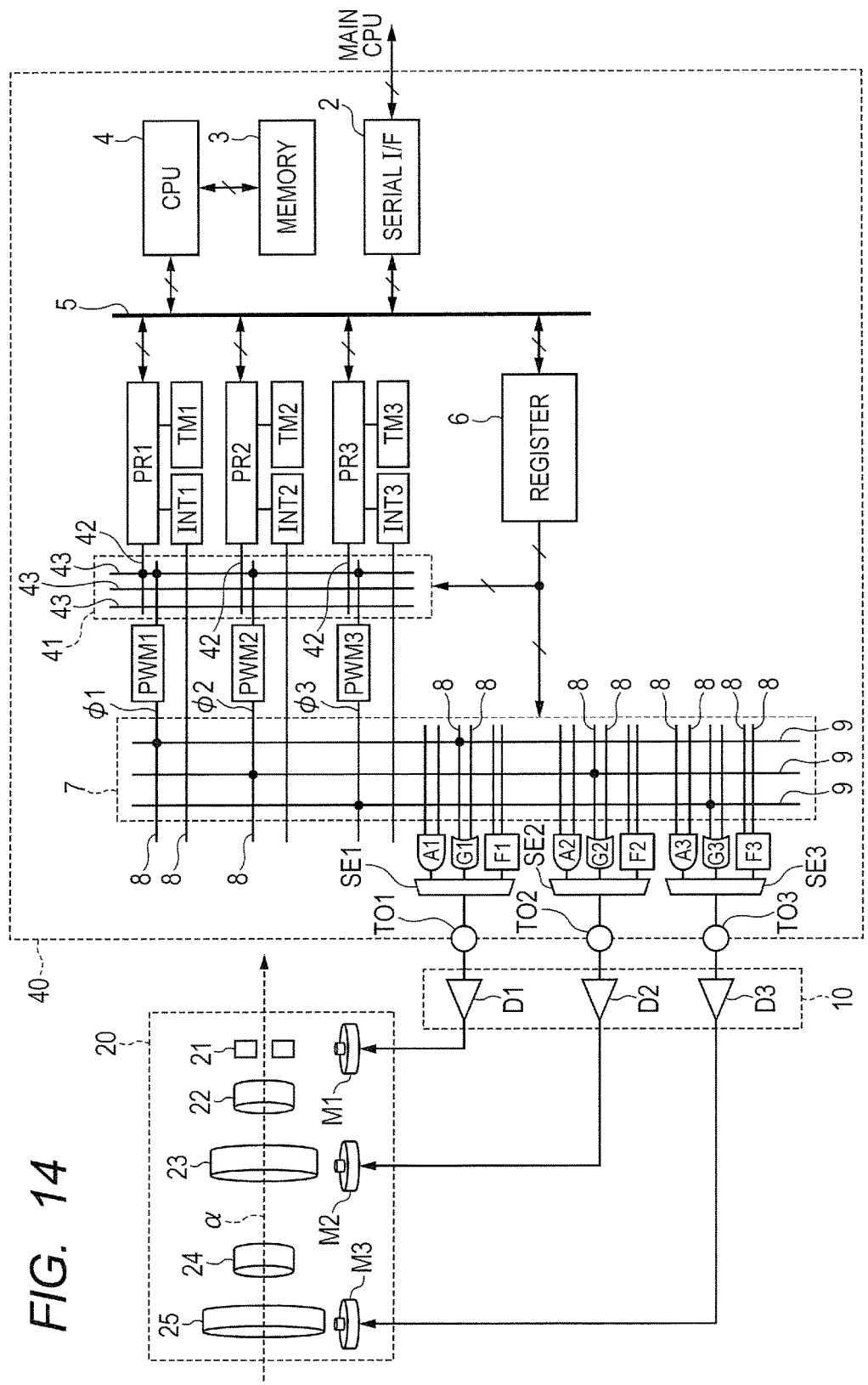
FIG. 14 is a circuit block diagram illustrating one example of main parts of a digital camera including the motor control device illustrated in FIG. 13.

FIG. 14 is a circuit block diagram illustrating one example of main parts of a digital camera including the motor control device 40 illustrated in FIG. 13 and is the diagram to be compared with that in FIG. 5. The first matrix set signal for giving the PWM signals □1 to □3 respectively to the output terminals TO1 to TO3 is written into the register 6. In addition, the selector set signal for giving the output signals from the OR gates G1 to G3 respectively to the output terminals TO1 to TO3 is written into the register 6. Further, the second matrix set signal for giving the information generated by the processor PR1 to the three PWM signal generation circuits PWM1 to PWM3 is written into the register 6.

In the matrix circuit 41, each switch SW is turned on or off in accordance with the matrix set signal from the register 6. In FIG. 14, the switches SW on the intersection parts indicated by the black spots in the plurality of intersection parts between the plurality of X wiring lines 8 and the plurality of Y wiring lines 9 are turned on and the switches SW other than the above-mentioned switches SW are turned off. One X wiring line 42 that receives the output signal from the processor PR1 is coupled to one Y wiring line 43, and the one Y wiring line 43 is coupled to three X wiring lines 42 that have been respectively coupled to the input nodes of the PWM signal generation circuits PWM1 to PWM3. There-fore, the output signal from the processor PR1 is given to the three PWM signal generation circuits PWM1 to PWM3.

In this state, any one of the PWM signal generation circuits PWM1 to PWM3 is selected and activated, for example, by the CPU 4.

The PWM signal □1 that has been generated by the PWM signal generation circuit PWM1 is given to the driver D1 via the matrix circuit 7, the OR gate G1, the selector SE1 and the output terminal TO1 and the motor M1 for use in lens stopping-down is driven by the driver D1.

The PWM signal □2 that has been generated by the PWM signal generation circuit PWM2 is given to the driver D2 via the matrix circuit 7, the OR gate G2, the selector SE2 and the output terminal TO2 and the motor M2 for use in auto-focusing is driven by the driver D2.

The PWM signal □3 that has been generated by the PWM signal generation circuit PWM3 is given to the driver D3 via the matrix circuit 7, the OR gate G3, the selector SE3 and the output terminal TO3 and the motor M3 for use in zooming is driven by the driver D3.

Since, in the Second Embodiment, only one processor PR1 is activated and the two processors PR2 and PR3 are deactivated, it is possible to promote a reduction in power consumption.

Third Embodiment

Figure 15:
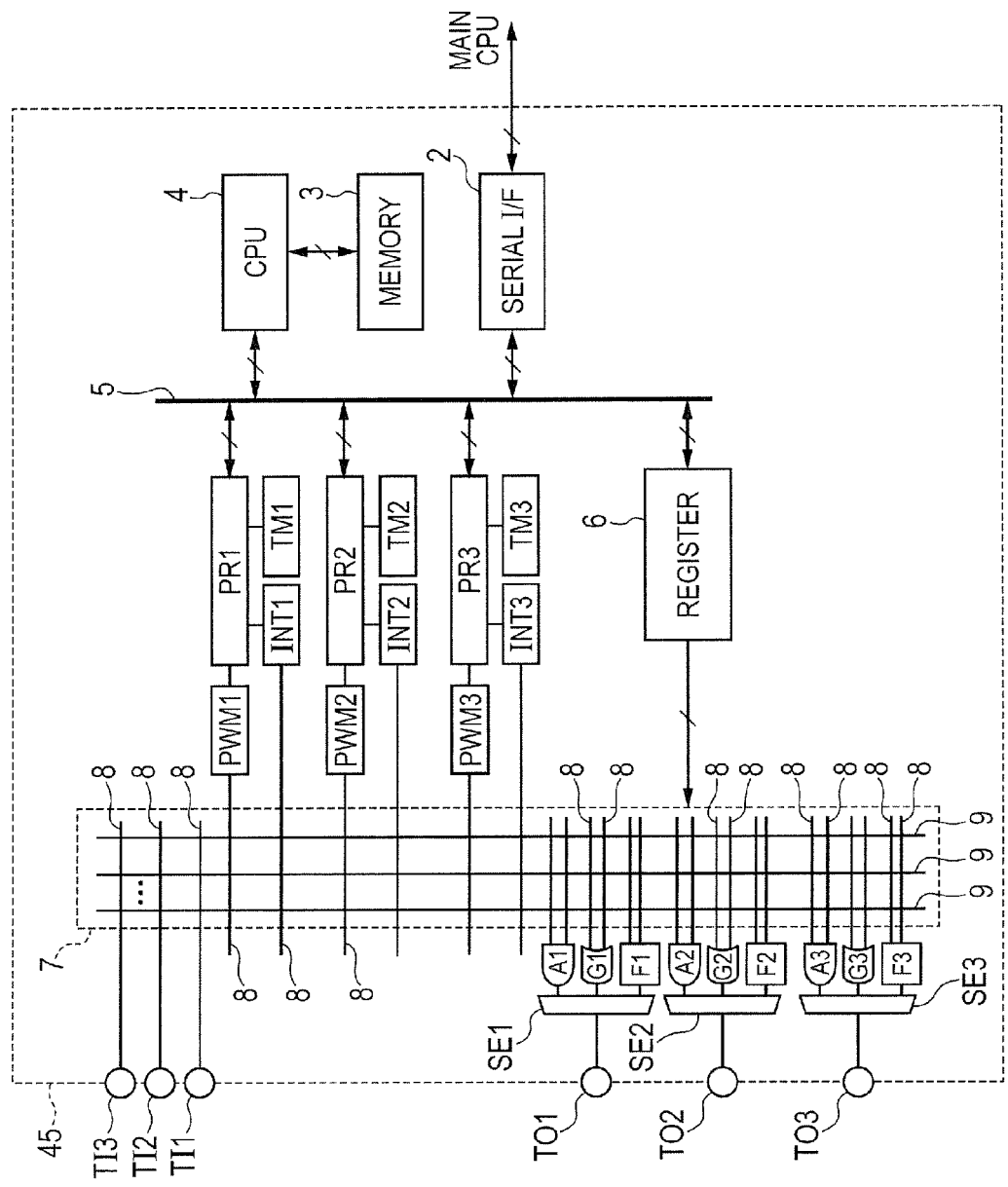
FIG. 15 is a circuit block diagram illustrating one example of a configuration of a motor control device according to a Third Embodiment of the present application.

FIG. 15 is a circuit block diagram illustrating one example of a configuration of a motor control device 45 according to a Third Embodiment of the present application and is the diagram to be compared with that in FIG. 3. With reference to FIG. 15, the motor control device 45 is different from the motor control device 1 in FIG. 3 in that three input terminals T11 to T13 are added. The three input terminals T11 to T13 are respectively coupled to three X wiring lines 8 of the matrix circuit 7.

Figure 16:
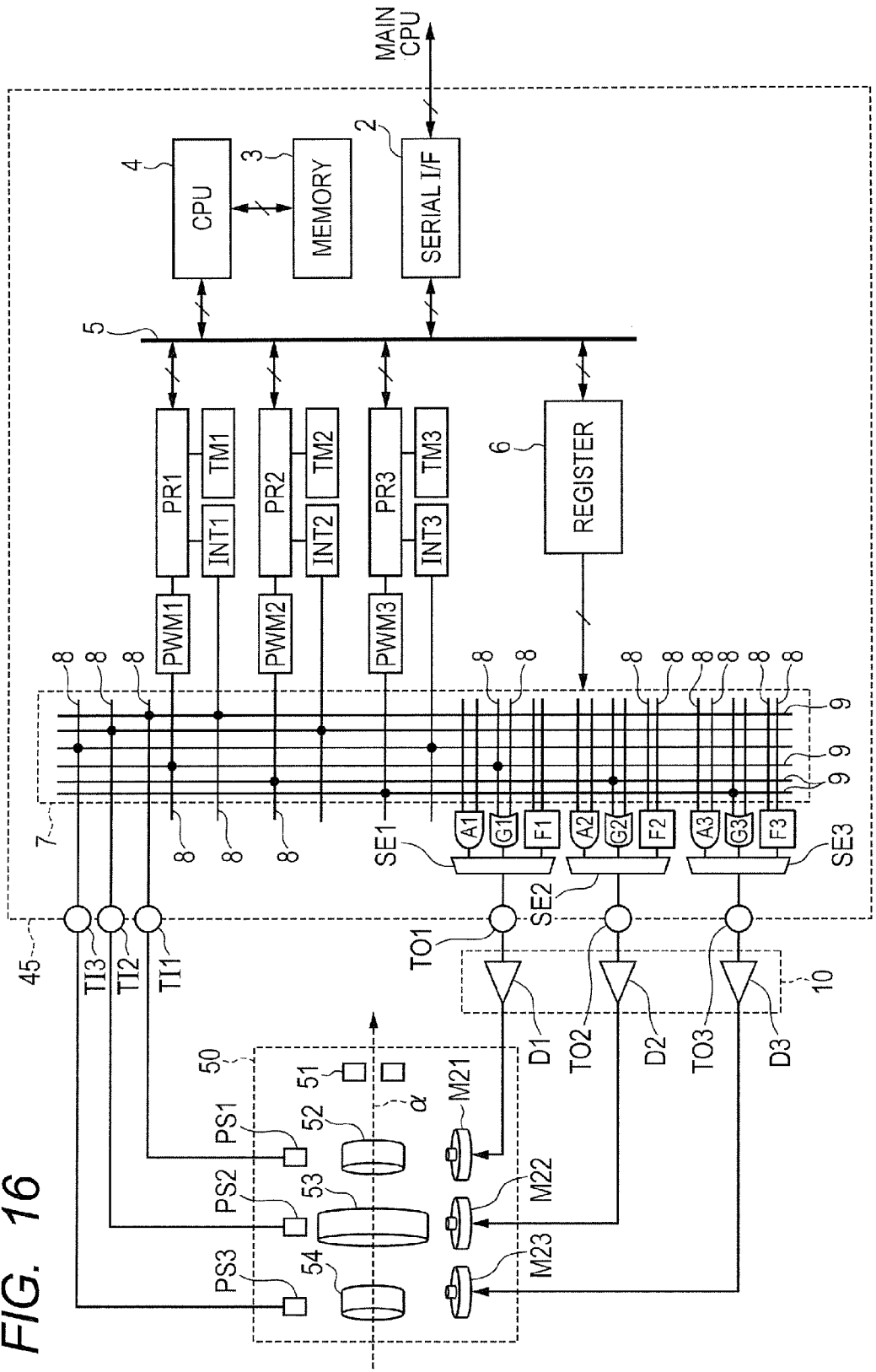
FIG. 16 is a circuit block diagram illustrating one example of main parts of a digital camera including the motor control device illustrated in FIG. 15.

Next, a using method of this motor control device 45 will be described. FIG. 16 is a circuit block diagram illustrating one example of main parts of a digital camera including the motor control device 45 illustrated in FIG. 15 and is the diagram to be compared with that in FIG. 5. In FIG. 16, the digital camera includes the motor control device 45, the driver IC 10 and a lens unit 50.

The driver IC 10 includes the three drivers D1 to D3. Each of the drivers D1 to D3 supplies a current for driving each motor to the lens unit 50 in response to the signal from each of the output terminals TO1 to TO3 of the motor control device 45.

The lens unit 50 includes a diaphragm mechanism 51, lenses 52 to 54, motors M21 to M23 and position sensors PS1 to PS3. The diaphragm mechanism 21 adjusts the amount of light a passing through the lenses 52 to 54 to adjust the brightness of the image. The motors M21 to M23 are respectively driven with output currents from the drivers D1 to D3 and respectively adjust the positions in the optical axis direction of the lenses 52 to 54. It is possible to adjust focus, the rate of magnification of the image and so forth by adjusting the positions of the lenses 52 to 54. The position sensors PS1 to PS3 respectively detect the positions of the lenses 52 to 54 and output signals indicative of results of detection respectively to the input terminals T11 to T13.

The matrix set signal for giving the three PWM signals □1 to □3 respectively to the OR gates G1 to G3 and coupling the input terminals T11 to T13 respectively to the interruption controllers INt1 to INt3 is written into the register 6 of the motor control device 45. In addition, the selector set signal for giving the output signals 00 from the OR gates G1 to G3 respectively to the output terminals TO1 to TO3 is written into the register 6.

In the matrix circuit 7, each switch SW is turned on or off in accordance with the matrix set signal from the register 6. In FIG. 16, the switches SW on the intersection parts indicated by the black spots in the plurality of intersection parts between the plurality of X wiring lines 8 and the plurality of Y wiring lines 9 are turned on and the switches SW other than the above-mentioned switches SW are turned off. Three X wiring lines 8 that respectively receive the PWM signals □1 to □3 are respectively coupled to three Y wiring lines 9, and the three Y wiring lines 9 are respectively coupled to three X wiring lines 8 each of which is coupled to one input node of each of the OR gates G1 to G3.

Three X wiring lines 8 that have been respectively coupled to the input terminals T11 to T13 are respectively coupled to three Y wiring lines 9, and the three Y wiring lines 9 are respectively coupled to three X wiring lines 8 that have been respectively coupled to the interruption controllers INT1 to INT3.

The selector SE1 gives the output signal from the OR gate G1 to the output terminal TO1 in accordance with the selector set signal from the register 6. The selector SE2 gives the output signal from the OR gate G2 to the output terminal TO2 in accordance with the selector set signal from the register 6. The selector SE3 gives the output signal from the OR gate G3 to the output terminal TO3 in accordance with the selector set signal from the register 6.

Thereby, the PWM signal □1 that has been generated by the PWM signal generation circuit PWM1 is given to the driver D1 via the matrix circuit 7, the OR gate G1, the selector SE1 and the output terminal TO1, the motor M21 is driven by the driver D1 and the position of the lens 52 is adjusted.

In addition, the PWM signal □2 that has been generated by the PWM signal generation circuit PWM2 is given to the driver D2 via the matrix circuit 7, the OR gate G2, the selector SE2 and the output terminal TO2, the motor M22 is driven by the driver D2 and the position of the lens 53 is adjusted.

In addition, the PWM signal □3 that has been generated by the PWM signal generation circuit PWM3 is given to the driver D3 via the matrix circuit 7, the OR gate G3, the selector SE3 and the output terminal TO3, the motor M23 is driven by the driver D3 and the position of the lens 54 is adjusted.

An output signal from the position sensor PS1 is given to the interruption controller INT1 via the input terminal T11 and the matrix circuit 7. The interruption controller INT1 generates a position control signal on the basis of the signal from the position sensor PS1 and gives the generated position control signal to the processor PR1. The processor PR1 gives information that is based on the position control signal to the PWM signal generation circuit PWM1. The PWM signal generation circuit PWM1 generates the PWM signal □1 on the basis of the information from the processor PR1. Thereby, the lens 52 is positioned to a desired position.

In addition, an output signal from the position sensor PS2 is given to the interruption controller INT2 via the input terminal T12 and the matrix circuit 7. The interruption controller INT2 generates a position control signal on the basis of the signal from the position sensor PS2 and gives the generated position control signal to the processor PR2. The processor PR2 gives information that is based on the position control signal to the PWM signal generation circuit PWM2. The PWM signal generation circuit PWM2 generates the PWM signal □2 on the basis of the information from the processor PR2. Thereby, the lens 53 is positioned to a desired position.

In addition, an output signal from the position sensor PS3 is given to the interruption controller INT3 via the input terminal T13 and the matrix circuit 7. The interruption controller INT3 generates a position control signal on the basis of the signal from the position sensor PS3 and gives the generated position control signal to the processor PR3. The processor PR3 gives information that is based on the position control signal to the PWM signal generation circuit PWM3. The PWM signal generation circuit PWM3 generates the PWM signal □3 on the basis of the information from the processor PR3. Thereby, the lens 54 is positioned to a desired position. The same advantageous effects as those in the First Embodiment are obtained also in the Third Embodiment.

Although, in the foregoing, the invention made by the inventors and others of the present invention has been specifically described on the basis of the preferred embodiments, it goes without saying that the present invention is not limited to the aforementioned embodiments and may be modified in a variety of ways within the scope not deviating from the gist of the present invention.

What is claimed is:

1. A motor control device that controls a motor, comprising: a plurality of processors, each being adapted to generate information for generating a PWM signal;
   a plurality of PWM signal generation circuits, each being provided corresponding to each of the processors and adapted to generate the PWM signal on the basis of the information that has been generated by the corresponding processor;
   a plurality of output terminals; and
   a first switch circuit that selectively gives the PWM signal generated by each of the PWM signal generation circuits to any of the output terminals.

2. The motor control device according to claim 1, further comprising:
   a register into which a corresponding relation between each of the PWM signal generation circuits and each of the output terminals is written,
   wherein the first switch circuit gives the PWM signal generated by each of the PWM signal generation circuits to the corresponding output terminal on the basis of the corresponding relation written into the register.

3. The motor control device according to claim 1, further comprising:
   a second switch circuit that selectively gives the information generated by each of the processors to any of the PWM signal generation circuits.

4. The motor control device according to claim 3, further comprising:
   a register into which a first corresponding relation between each of the PWM signal generation circuits and each of the output terminals and a second corresponding relation between each of the processors and each of the PWM signal generation circuits are written,
   wherein the first switch circuit gives the PWM signal generated by each of the PWM signal generation circuits to the corresponding output terminal on the basis of the first corresponding relation written into the register and the second switch circuit gives the information generated by each of the processors to the corresponding PWM signal generation circuit on the basis of the second relation written into the register.

5. The motor control device according to claim 1, further comprising:
  a plurality of logic circuits, each being provided corresponding to each of the output terminals,
  wherein the first switch circuit selectively gives the PWM signal generated by each of the PWM signal generation circuits to any one or two or more of the logic circuits, and each of the logic circuits gives a signal that has been generated on the basis of one or two or more PWM signal/signals given from the first switch circuit to the corresponding output terminal.

6. The motor control device according to claim 5, further comprising:
  a register into which a corresponding relation between each of the PWM signal generation circuits and a plurality of input nodes of each of the logic circuits is written,
  wherein the first switch circuit gives the PWM signal generated by each of the PWM signal generation circuits to the corresponding logic circuit on the basis of the corresponding relation written into the register.

7. The motor control device according to claim 5,
  wherein each of the logic circuits includes an OR gate.

8. The motor control device according to claim 5,
  wherein each of the logic circuits includes an AND gate.

9. The motor control device according to claim 5,
  wherein each of the logic circuits includes a flip flop that is set with one PWM signal given from the switch circuit to output a signal of a first logic level, and is reset with another PWM signal given from the switch circuit to output a signal of a second logic level.

10. The motor control device according to claim 1, further comprising:
  a plurality of interruption controllers, each being provided corresponding to each of the processors,
  wherein the first switch circuit selectively gives the PWM signal generated by each of the PWM signal generation circuits to any of the interruption controllers, each of the interruption controllers generates a timing control signal on the basis of the PWM signal given from the first switch circuit and gives the generated timing control signal to the corresponding processor, and each of the processors generates the PWM signal on the basis of the timing control signal given from the corresponding interruption controller.

11. The motor control device according to claim 1, further comprising:
  a plurality of interruption controllers, each being provided corresponding to each of the processors,
  wherein a plurality of motors are used to respectively adjust positions of a plurality of objects, a plurality of position sensors that respectively detect the positions of the objects are included, the first switch circuit selectively gives a position detection signal generated by each of the position sensors to any of the interruption controllers, each of the interruption controllers generates a position control signal on the basis of the position detection signal given from the switch circuit and gives the generated position control signal to the corresponding processor, and each of the processors generates the PWM signal on the basis of the position control signal given from the corresponding interruption controller.

12. The motor control device according to claim 1,
  wherein a plurality of the PWM signals output from the output terminals are respectively used to control a plurality of motors.

13. The motor control device according to claim 1,
  wherein three PWM signals output from three output terminals in the output terminals are used to control a three-phase motor.

14. A semiconductor device that outputs a PWM signal, comprising:
  a plurality of output terminals;
  a plurality of PWM signal generation circuits;
  a switch circuit;
  a memory circuit; and
  a CPU,
  wherein each of the PWM signal generation circuits generates a PWM signal that is based on a control signal supplied from the CPU, and the switch circuit includes an output stage including a plurality of output units that are respectively coupled with the output terminals and outputs each of the generated PWM signals to an optional output unit/units in the output units on the basis of coupling information stored in the memory circuit.

15. A lens unit for imaging apparatus, comprising:
  a plurality of lenses;
  a plurality of motors that drive the lenses;
  a motor control device that outputs a plurality of PWM signals; and
  a driver device that applies a drive current that is based on each of the PWM signals to each of the motors,
  wherein the motor control device includes a plurality of output terminals, a plurality of PWM signal generation circuits, a switch circuit, a memory circuit and a CPU, each of the PWM signal generation circuits generates each PWM signal that is based on a control signal supplied from the CPU, and the switch circuit includes an output stage including a plurality of output units that are respectively coupled with the output terminals and outputs each of the generated PWM signals to an optional output unit/units in the output units on the basis of coupling information stored in the memory circuit.

16. An imaging apparatus, comprising
  the lens unit for imaging apparatus according to claim 15.

* * * * *